United States Patent
Csik et al.

(10) Patent No.: US 7,389,161 B2
(45) Date of Patent: Jun. 17, 2008

(54) AERONAUTICAL NAVIGATION PLOTTING INSTRUMENT

(76) Inventors: Stephen C. Csik, 416 Concord Ave., Monrovia, CA (US) 91016; Kevin Lee Bender, 11152 Wallingsford #8J, Rossmoor, CA (US) 90720

( * ) Notice: Subject to any disclaimer, the term of this patent is extended or adjusted under 35 U.S.C. 154(b) by 721 days.

(21) Appl. No.: 11/012,467

(22) Filed: Dec. 15, 2004

(65) Prior Publication Data

US 2005/0228550 A1    Oct. 13, 2005

Related U.S. Application Data

(60) Provisional application No. 60/529,543, filed on Dec. 15, 2003.

(51) Int. Cl.
*B64C 23/00* (2006.01)
(52) U.S. Cl. .............. 701/3; 701/14; 701/224; 701/13; 342/357.14
(58) Field of Classification Search .............. 701/3, 701/13–16, 224; 342/357.14; 244/158.1
See application file for complete search history.

(56) References Cited

U.S. PATENT DOCUMENTS

| | | | |
|---|---|---|---|
| 1,746,537 A | 2/1930 | Knechtel | |
| 1,848,894 A | 3/1932 | Lendvay | |
| 1,917,278 A | 7/1933 | Weems | |
| 2,425,097 A | 8/1947 | Isom | |
| 2,449,342 A | 9/1948 | Tardif | |
| 2,753,112 A | 7/1956 | Blom-Bakke | |
| 3,271,866 A | 9/1966 | Gruber et al. | |
| 3,460,259 A | 8/1969 | Simpson | |
| 3,496,640 A | 2/1970 | Warner | |
| 3,526,963 A | 9/1970 | Pansmith | |
| 3,540,127 A | 11/1970 | Kane | |
| 3,611,574 A | 10/1971 | Young et al. | |
| 3,665,607 A | 5/1972 | Clark | |
| 3,690,009 A * | 9/1972 | Henley, III | 33/1 MP |
| 3,813,783 A | 6/1974 | Price | |
| 3,855,706 A | 12/1974 | Price | |
| 3,908,274 A | 9/1975 | Gerry | |
| 4,153,995 A | 5/1979 | Oertli | |
| 4,383,372 A | 5/1983 | Zane et al. | |
| 4,637,143 A | 1/1987 | Telles | |
| 4,969,271 A | 11/1990 | Sump | |
| 5,167,076 A | 12/1992 | Sump | |
| 5,241,754 A | 9/1993 | Hogan | |
| 6,134,796 A | 10/2000 | Johnson | |

* cited by examiner

*Primary Examiner*—Gertrude A. Jeanglaude
(74) *Attorney, Agent, or Firm*—Christie, Parker & Hale, LLP.

(57) ABSTRACT

An aeronautical navigation plotting instrument is provided that includes a plotting frame and a compass rose attached to the plotting frame. The compass rose includes angular markings incrementally disposed thereon about a center of the compass for defining the angular orientation of the compass. A longitudinal slot is aligned with the center of the compass rose and extends through the plotting frame to define an opening for receiving a writing instrument. A plurality of first radial openings extends through the plotting frame to allow a writing instrument to extend therethrough. Each first radial opening is incrementally spaced from an originating opening in the plotting frame to form a plurality of incrementally spaced radial distances from the originating opening.

30 Claims, 6 Drawing Sheets

AERONAUTICAL NAVIGATION PLOTTING INSTRUMENT

CROSS-REFERENCE TO RELATED APPLICATION

This application claims priority under 35 U.S.C. § 119(e) to U.S. Provisional Application Ser. No. 60/529,543, filed on Dec. 15, 2003, which is incorporated herein by reference.

FIELD OF THE INVENTION

The present invention relates generally to an aeronautical navigation plotting instrument and particularly to a plotting instrument for manually plotting flight and/or navigation plans, such as the locations of temporary flight restrictions.

BACKGROUND OF THE INVENTION

Commercial and general aeronautical activities within the United States are regulated by the Federal Aviation Regulations, contained within Title 14 Code of Federal Regulations, and are enforced by the Federal Aviation Administration (FAA). In general, the Federal Aviation Regulations define standards, certification requirements, flight rules and operational criteria that effect all facets of aviation activities. Under Part 91 of the Federal Aviation Regulations—General Operating and Flight Rules, Subpart B—General Flight Rules, several definitions and rules are listed which define various criteria for operation of an aircraft within several classifications of airspace. More specifically, provisions are listed that may be used to temporarily limit or restrict flight operations in a localized area. This is commonly referred to as a Temporary Flight Restriction (TFR). Some of these rules, which have been exercised in higher volume include: 91.137—Temporary flight restrictions; 91.139—Emergency air traffic rules; 91.141—Flight restrictions in the proximity of the Presidential and other parties; and 91.143—Flight limitations in the proximity of space flight operations.

Prior to the terrorist events of Sep. 11, 2001, temporary flight restrictions were typically created near the vicinity of major wildfires in order to provide a safer flight-operating environment for firefighting aircraft in that area. Incursions by "non official" aircraft into these types of temporarily restricted airspace occurred on a somewhat regular basis, especially if the restricted airspace was in or near a congested metropolitan airspace. Although severe monetary and criminal consequences for such incidents were, and still remain possible, authorities often handled these situations by speaking with the pilot or flight crew and providing them with a thorough review of the TFR regulations. If the incursion was deemed by the authorities to be deliberate, or if the pilot had a record of repeated violations of this type, a temporary suspension, heightened observation of the pilot, or permanent revocation of the pilot certificate was likely.

Since the terrorist attacks of Sep. 11, 2001 supervision and punishment of TFR infractions has dramatically increased. The FAA, the Federal Bureau of Investigation, and possibly the United States Secret Service investigates TFR violations and enforces the TFR regulations to the fullest extent possible. A pilot who is a first offender of a TFR can expect to be fined a minimum of $10,000, be imprisoned and/or receive certificate suspension/revocation. Also, in TFRs which have been created for national security purposes, the military is authorized to shoot down any aircraft that is in violation of the TFR. As such, flight crews and aircraft operators are currently exercising extreme caution regarding navigation around TFRs.

Under current conditions, a pilot or other member of the flight crew who is planning a Visual Flight Rules (VFR) flight (a flight where the pilot navigates an aircraft using visual references external to the aircraft) typically consults an FAA Flight Service Station an official internet site for current weather, current TFRs and other critical information for flight planning. Since TFRs have become such important flying restrictions, with such severe consequences, this information is usually regarded with high interest. While the FAA attempts to provide graphical TFRs via the Internet, there have been frequent occurrences where these graphics have not been immediately available to the pilot. In such situations, a pilot typically contacts a flight briefer to obtain such information. After the pilot has obtained the position and size of any existing TFR from the flight briefer, the pilot may manually plot the location of the TFR and create a flight plan to navigate around the TFR. Accordingly, a need exists for a device that permits manual flight planning and navigation to be plotted on a standard aeronautical chart without requiring external power or other sophisticated systems.

SUMMARY OF THE INVENTION

In a first embodiment, the present invention is an aeronautical navigation plotting instrument that includes a plotting frame and a compass rose attached to the plotting frame. The compass includes angular markings incrementally disposed thereon about a center of the compass for defining the angular orientation of the compass. A longitudinal slot is aligned with the center of the compass rose and extends through the plotting frame to define an opening for receiving a writing instrument. A plurality of first radial openings extends through the plotting frame to allow a writing instrument to extend therethrough. Each first radial opening is incrementally spaced from an originating opening in the plotting frame to form a plurality of incrementally spaced radial distances from the originating opening.

In another embodiment, the present invention is an aeronautical navigation plotting instrument as described above in the first embodiment, and wherein the plotting frame includes a first end, a second end and first and second longitudinal edges extending therebetween. The compass rose includes a center opening that extends through the plotting frame to define an opening for receiving a writing instrument. The originating opening is disposed at the second end of the plotting frame and in alignment with the longitudinal slot.

In yet another embodiment, the present invention is a prepackaged kit that includes an aeronautical navigation plotting instrument as described above in the first embodiment and further including at least one writing instrument, and at least one highlighting writing instrument.

In still another embodiment, the present invention is a method of using aeronautical navigation plotting instrument as described above in the first embodiment including placing the center of the compass of the plotting frame over a center of a VOR on an aeronautical chart; orienting the longitudinal slot at a desired angular orientation with respect to the VOR by use of the angular markings of the compass; drawing a linear line radiating from the center of the compass of the plotting frame and linearly extending therefrom to signify a radial from the VOR; drawing an intersecting line on the radial at a desired distance from the center of the VOR forming a center of the temporary flight restriction by: placing a zero point of the graduated distance scale adjacent to the center of the VOR, measuring the desired distance from the center of the VOR by referencing the graduated distance scale, and drawing the intersecting line at the desired distance; placing the originating opening of the plotting frame over the center of the temporary flight restriction; placing a writing instrument within a desired one of the radial openings; and rotating the writing instrument about the originating opening of the plotting frame to form the temporary flight restriction having a desired radius.

DETAILED DESCRIPTION OF THE DRAWINGS

As shown in FIGS. 1-6, embodiments of the present invention are directed to an aeronautical navigation plotting instrument for manual plotting of flight plans onto an aeronautical chart. For example, as described in detail below, the plotting instrument of the present invention may be used for plotting a temporary flight restricted airspace, commonly referred to as a temporary flight restriction or a TFR, onto an aeronautical chart.

Figure 1:
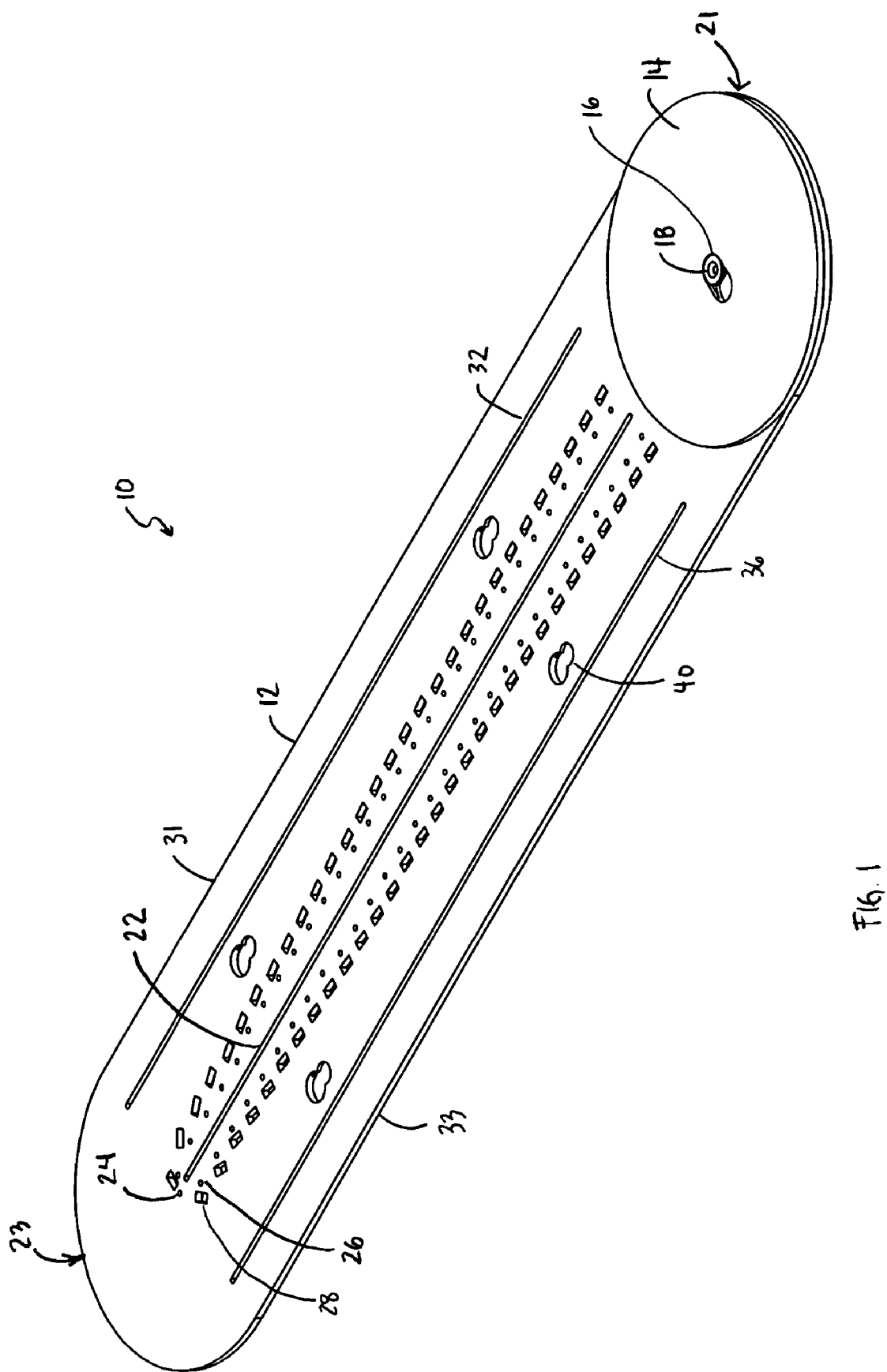
FIG. 1 is a top view of an aeronautical navigation plotting instrument according to one embodiment of the present invention, showing parallel rule attachment locations.
Figure 2:
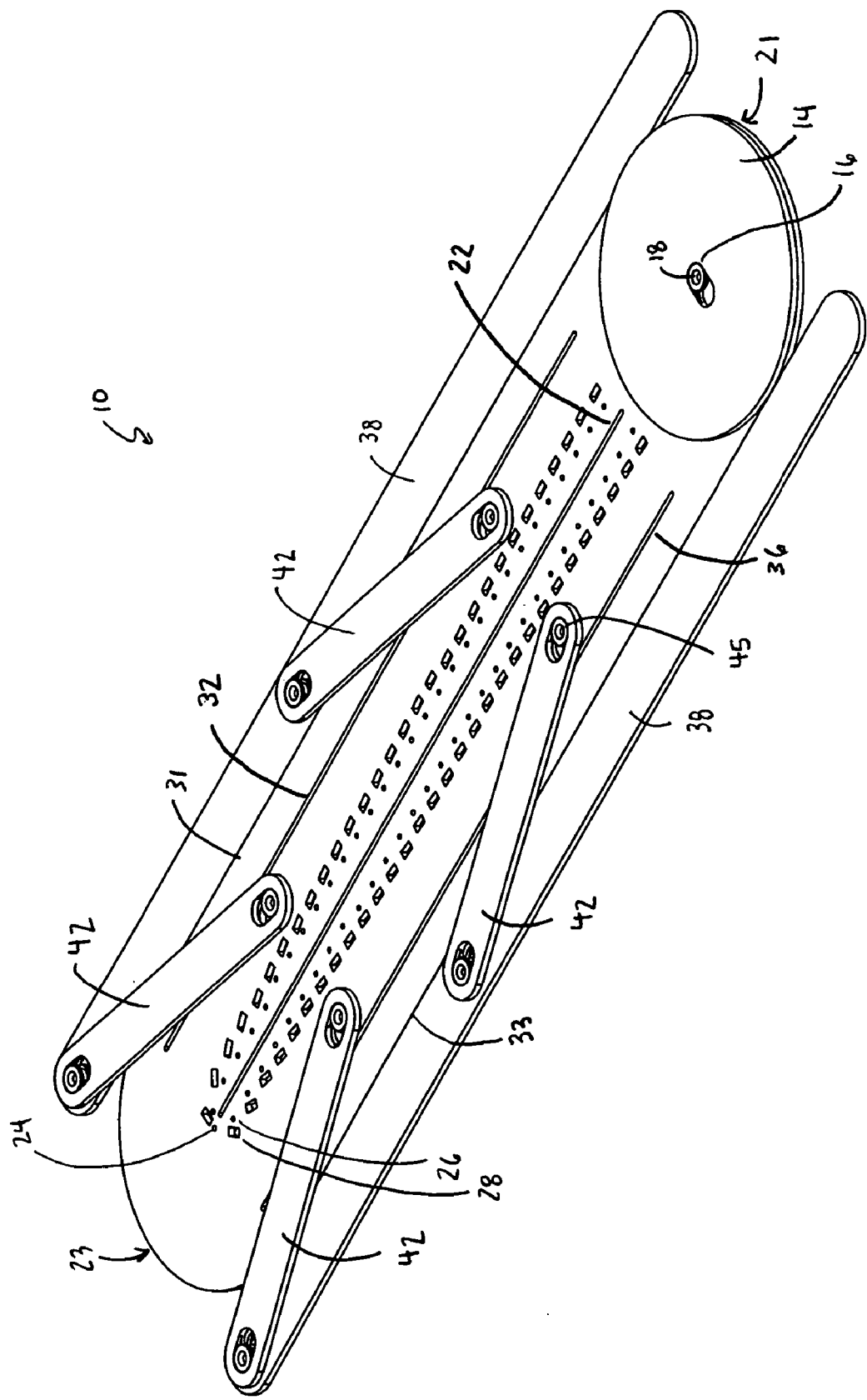
FIG. 2 is a top view of the plotting instrument of FIG. 1, showing parallel rules attached to the parallel rule attachment locations of FIG. 1.
Figure 3:
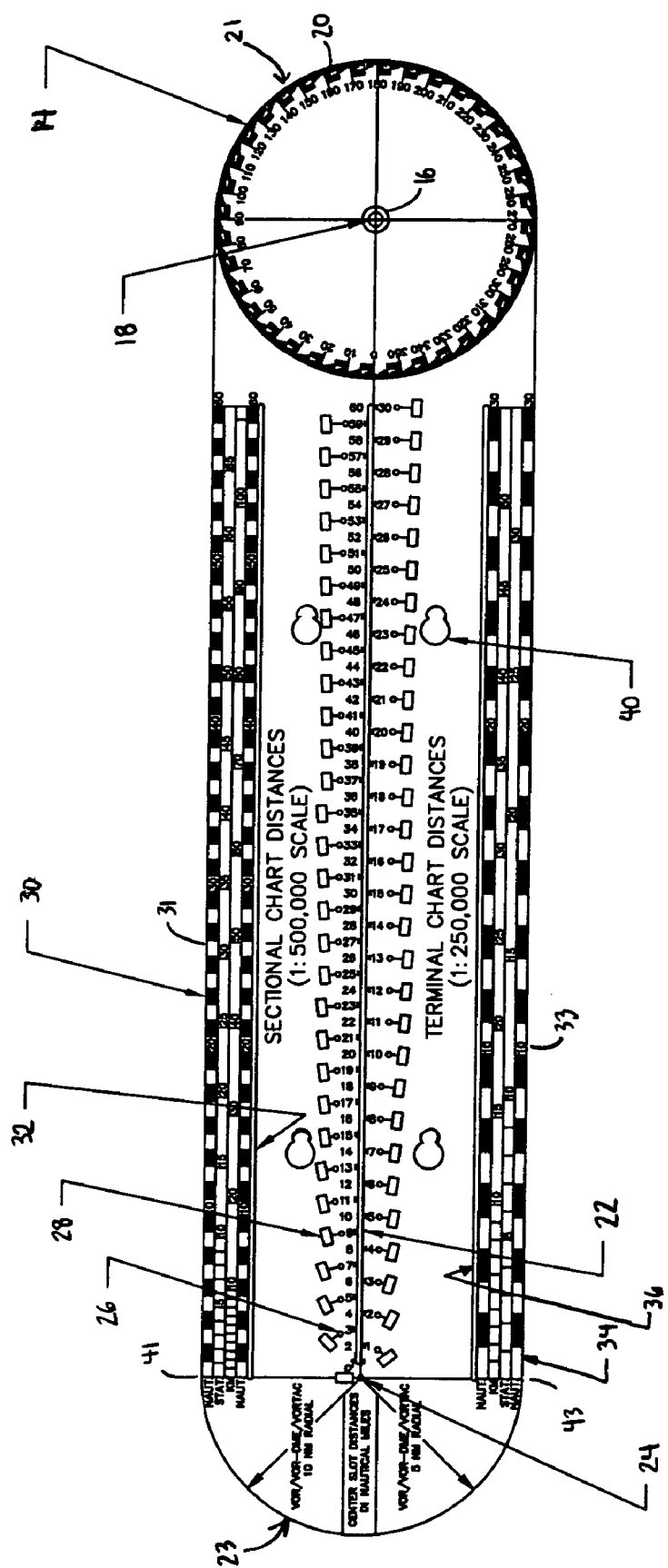
FIG. 3 is a top view of the plotting instrument of FIG. 1 showing various markings attached thereon.

FIGS. 1-3 show an aeronautical navigation plotting instrument 10 according to one embodiment of the invention. As shown in FIG. 1, the plotting instrument 10 includes a frame 12. In one embodiment, the frame 12 is formed from a transparent non-metallic material, such as Lexan or Acrylic, or a metallic material, such as aluminum, with dimensional markings and other informational text, markings and/or symbols imprinted on one or more surfaces of the frame 12 (note the these markings are shown in FIG. 3, but have been omitted from FIGS. 1 and 2 for clarity.)

Rotatably attached to the frame 12 is a disc-like compass rose/azimuth 14. In one embodiment, the compass 14 is formed from a transparent non-metallic material, such as Lexan or Acrylic, with functional language, numerals, symbols and/or patterns imprinted on one or more surfaces (see FIG. 3). In one embodiment, the compass 14 is rotatably attached to one end of the frame 12 by a fastener, such as a hollow shaft rivet 16. However, in other embodiments the compass 14 may be rotatably coupled to the frame 12 by other appropriate means.

The hollow shaft rivet 16 provides the advantage of allowing a writing instrument to be placed therethrough, as described in detail below. Preferably, the rivet 16 is concentrically attached to the compass 14, such that the hollow interior of the rivet 16 defines the center 18 of the compass 14. In one embodiment, the compass 14 is attached to a first end or a compass end 21 of the frame 12.

As shown in FIG. 3, the compass 14 contains angular markings 20 for defining the 360 degrees of the compass 14. In one embodiment, the angular markings 20 are disposed on the periphery of the compass 14. In the depicted embodiment, the angular markings 20 include multiple scales for defining different increments of the 360 degrees of the compass 14. As shown, a first scale forms an outer ring of angular markings that includes lines spaced at one degree increments; a second scale forms an intermediate ring of angular markings that includes alternatively colored and blank blocks spaced at five degree increments; and a third scale forms an inner ring of angular markings that includes lines spaced at 10 degree increments followed by a numeric indicator. In addition, centerlines or "crosshairs" cross the center 18 of the compass 14 to divide the compass 14 into 90 degree increments. In one embodiment, the compass 14 is substantially circular in shape and sized to approximate the size of a typical VOR/VORTAC/VOR-DME (where VOR stands for Very High Frequency Omni-Directional Radio Range, TAC stands for Tactical Air Navigation Aid and DME stands for Distance Measuring System) of a typical aeronautical chart. Hereinafter, including in the claims section, unless otherwise specified the terms VOR, VORTAC, and VOR-DME are generically referred to as a VOR.

The angular markings 20 are each aligned with the center 18 of the compass 14. The center 18 of the compass 14, in turn, is further aligned with a center slot 22. The center slot 22 is a longitudinal slot extending through the frame 12 to define an opening for receiving a writing instrument. The center slot 22 extends from a position adjacent to the peripheral edge of the compass 14 to a position adjacent to and aligned with a center hole 24 at a second end or radial end 23 of the frame 12, opposite from the compass end 21 of the frame 12. The center slot 22 allows a user to draw a line originating and radiating from the center 18 of the compass 14, as described in more detail below.

Using the compass 14 in combination with the center slot 22 a linear line may be drawn radiating from a desired origination point on an aeronautical chart. For example, in order to plot a path at a desired radial (angle) away from an origination point on an aeronautical chart, a user places the center 18 of the compass 14 over the desired origination point on the aeronautical chart, rotates the compass 14 to a desired rotation by referencing the angular markings 20 on the compass 14, and draws a line through the center slot 22 of the frame 12. After the line is drawn, a linear line radiating from the desired origination point and extending therefrom at the desired angle is produced.

Opposite from the compass end 21 of the frame 12 is the radial end 23 of the frame 12 having the center hole 24. Preferably, the center hole 24 is aligned with respect to the center slot 22 and centered with respect to the radial end 23 of the frame 23. The center hole 24 extends through the frame 12 to allow a writing instrument, or another similar instrument, to extend therethrough. Incrementally positioned from the center hole 24 are a plurality of radial holes 26 similarly extending through the frame 12 to allow a writing instrument to extend therethrough. Each radial hole 26 corresponds to a radial distance which originates from the center hole 24.

In the depicted embodiment of FIG. 3, each radial hole 26 is incrementally positioned by a predetermined fraction of one nautical mile from the center hole 24. The predetermined fraction is chosen to coincide with conversion scales commonly used in aeronautical charts, such as the terminal area chart scale (1:250,000), the sectional chart scale (1:500, 000), the world aeronautical chart scale (1:1,000,000), and the helicopter route chart scale (1:125,000), among other appropriate scales. In the depicted embodiment, the radial holes 26 below the center slot 22 are incrementally positioned according to the terminal chart scale, and the radial holes 26 above the center slot 22 are incrementally positioned according to the sectional chart scale (note that the radial holes 26 above the center slot 22 represent odd numbered miles according to the sectional chart scale and, since the terminal chart scale is two times the sectional chart scale, the radial holes 26 below the center slot 22 also represent the even numbered miles according to the sectional chart scale.

A user may use the center hole 24 in combination with a desired one of the radial holes 26 to create an arc or circle of a desired size by inserting a writing instrument, or similar instrument, into the center hole 24; inserting a second writing instrument into a desired radial hole 26; and rotating the frame 12 about the center hole 24 to create the desired arc or circle having the desired radius. In one embodiment, each radial hole 26 is substantially circular in shape and sized to receive the writing end of a pencil, such as a Pentel®0.5 mm mechanical pencil.

In one embodiment, the frame 12 includes a plurality of first radial holes 26 incrementally positioned from the center hole 24 as described above, and a plurality of second radial holes 28. Each second radial hole 28 extends through the frame 12 to allow a writing instrument to extend therethrough. In addition, each second radial hole 28 is disposed adjacent to, and at the same radial distance from the center hole 24, as a corresponding one of the first radial holes 26. In one embodiment, each second radial hole 28 is substantially rectangular in shape and sized to receive the writing end of a highlighting writing instrument, such as a Marvy® Erasable Fluorescent pen.

A user may use a desired one of the second radial holes 28 to create an arc or circle in the same manner as described above with respect to the first radial holes 26. However, since the user may use a highlighting writing instrument with the second radial holes 28, a more striking or a more noticeable arc or circle may be made using the second radial holes 28.

In one embodiment, the frame 12 includes at least one graduated distance scale 30 along at least one of the longitudinal edges of the frame 12. The graduated distance scale 30 depicts typical distance increments used for flight planning and navigation, such as nautical miles, statute miles and kilometers, and are in appropriate scales for use on common aeronautical charts, such as the scales described above with respect to the radial holes, for example the terminal area chart scale, the sectional chart scale, the world aeronautical chart scale, and the helicopter route chart scale, among other appropriate scales.

In the embodiment of FIG. 3, the graduated distance scale 30 includes a plurality of scales. In this example, the graduated distance scale 30 includes a nautical mile scale adjacent to a first longitudinal edge 31 of the frame, a statute mile scale directly below the nautical mile scale, a kilometer scale directly below the statute mile scale, a second nautical mile scale directly below the kilometer scale, and a longitudinal distance slot 32 (discussed below) directly below the second nautical mile scale. As shown, each of these four scales includes appropriate incremental symbolic and/or numeric markings, which provide highly visual, simple distance conversions.

The graduated distance scale 30 is adjacent to the first longitudinal edge 31 of the frame 12 so that the graduated distance scale 30 may be placed next to a drawn line to measure the distance of the drawn line. For example, after a user has used the compass 14 and the center slot 22 to draw a linear line radiating from a desired origination point and extending therefrom at the desired angle, the user may place the first longitudinal edge 31 of the frame 12 adjacent to the drawn linear line such that a zero point 41 of the graduated distance scale 30 is adjacent to the desired origination point, the graduated distance scale 30 may then be used to mark off a desired distance along the drawn linear line from the desired origination point. As a result, the plotting instrument 10 may be used to draw a liner line radiating from a desired origination point and extending therefrom at the desired angle and marked at a specific radial distance.

Referring again to FIG. 3, adjacent to the graduated distance scale 30 is the longitudinal distance slot 32 extending through the fame 12 to define an opening for receiving a writing instrument. The distance slot is aligned with the zero point 41 of the graduated distance scale 30. The distance slot 32 allows a line of a desired linear length to be drawn by inserting a written instrument into the distance slot 32, and drawing a linear line starting at the zero point 41 and terminating at the desired linear length determined by referencing the graduated distance scale 30.

Since a majority of aeronautical flight planning is done in nautical miles, in the depicted embodiment the graduated distance scale 30 includes a first nautical mile scale adjacent to the first longitudinal edge 31 of the frame 12, and a second nautical mile scale adjacent to the distance slot 32.

In one embodiment, the distance slot 32 is parallel to the center slot 22. As shown in FIG. 3, the zero point 41 of the graduated distance scale 30 and the distance slot 32 are aligned both with each other and with the center hole 24. In such an embodiment a line of a desired length may be drawn radiating from the center hole 24 by placing a writing instrument through the center slot 22; inserting a writing instrument within the center slot 22; and drawing a linear line starting at the end of the center slot 22 that is adjacent to the center hole 24 and terminating the line at the desired linear length determined by referencing the graduated distance scale 30.

In one embodiment, the frame 12 includes a first graduated distance scale 30 disposed along a first longitudinal edge 31 of the frame 12, as described above, and a second graduated distance scale 34 along a second longitudinal edge 33 of the frame 12. In this embodiment the first and second graduated distance scales 30 and 34 are identical except that they are drawn to different conversion scales. For example, as shown in FIG. 3, the first graduated distance scale 30 is drawn to correspond to the sectional chart distances (at a scale of 1:500,000) and the second graduated distance scale 34 is drawn to correspond to the terminal chart distances (at a scale of 1:250,000).

Similar to the first graduated distance scale 30, adjacent to the second graduated distance scale 32 is a second longitudinal distance slot 36 extending through the fame 12 to define an opening for receiving a writing instrument The second distance slot 34 allows a line of a desired distance to be drawn in the same manner as described above with respect to the first distance slot 32.

In one embodiment, the second distance slot 36 is parallel to the center slot 22. As shown in FIG. 3, a zero point 43 of the second graduated distance scale 34 and the second distance slot 36 are aligned both with each other and with the center hole 24. As is also shown in FIG. 3, the starting points or zero points of the each graduated distance scale 30 and 34 and each distance slot 32 and 36 are aligned and form a straight line through the center hole 24.

As shown in FIG. 2, the plotting instrument 10 may also include one or more parallel rules 38. The parallel rules 38 are omitted from FIGS. 1 and 3 for clarity purposes and so that parallel rule attachment locations 40 made be shown. In the embodiment of FIG. 2, a parallel rule 38 is attached to each longitudinal side 31 and 33 of the frame 12. Each parallel rule 38 is attached to the frame 12 at two or more parallel rule attachment locations 40 (see FIG. 1 or 3) through two or more links 42 (see FIG. 2) to form a moveable parallelogram.

Each link 42 is attached at one end one of the parallel rule attachment locations 40 on the frame 12, and at an opposite end to one of the parallel rules 38. Each link 42 is rotatably mounted to its corresponding attachment location 40 on the frame 12. Each parallel rule 38, in turn, is movable parallel to the longitudinal axis, or the center slot 22 of the frame 12 by movement of its links 42, allowing a user to place one of the center slot 22 or one of the distance slots 32 over a desired line and use one of the parallel rules 38 to plot a course parallel to the desired line.

Each parallel rule 38, as well as each link, is formed from a non-metallic material, such as Lexan or Acrylic, or a metallic material, such as aluminum. In addition, each parallel rule 38 may or may not have functional language, numerals, symbols or patterns imprinted on one or more of its surfaces.

Although each parallel rule 38 may be permanently attached to the frame 12, in the embodiment of FIG. 2, each parallel rule 38 is removably attached to the frame 12. This removable attachment may be accomplish by any appropriate means. For example, in the embodiment of FIG. 2, each parallel rule attachment location 40 of the frame 12 is "snowman" shaped. That is, each location 40 includes an enlarged partial circle leading into a smaller partial circle. As such, fasteners 45 attached to the links 42 are sized to fit loosely within the enlarged partial circle and snap fit into the smaller partial circle of a corresponding one of the attachment locations 40. In one embodiment, the frame 12 includes a attachment location shaped similar to the above described parallel rule attachment locations 40 so that the fastener 16 of the compass 14, and hence the compass 14 itself, may be removably attached to the frame 12.

Figure 4:
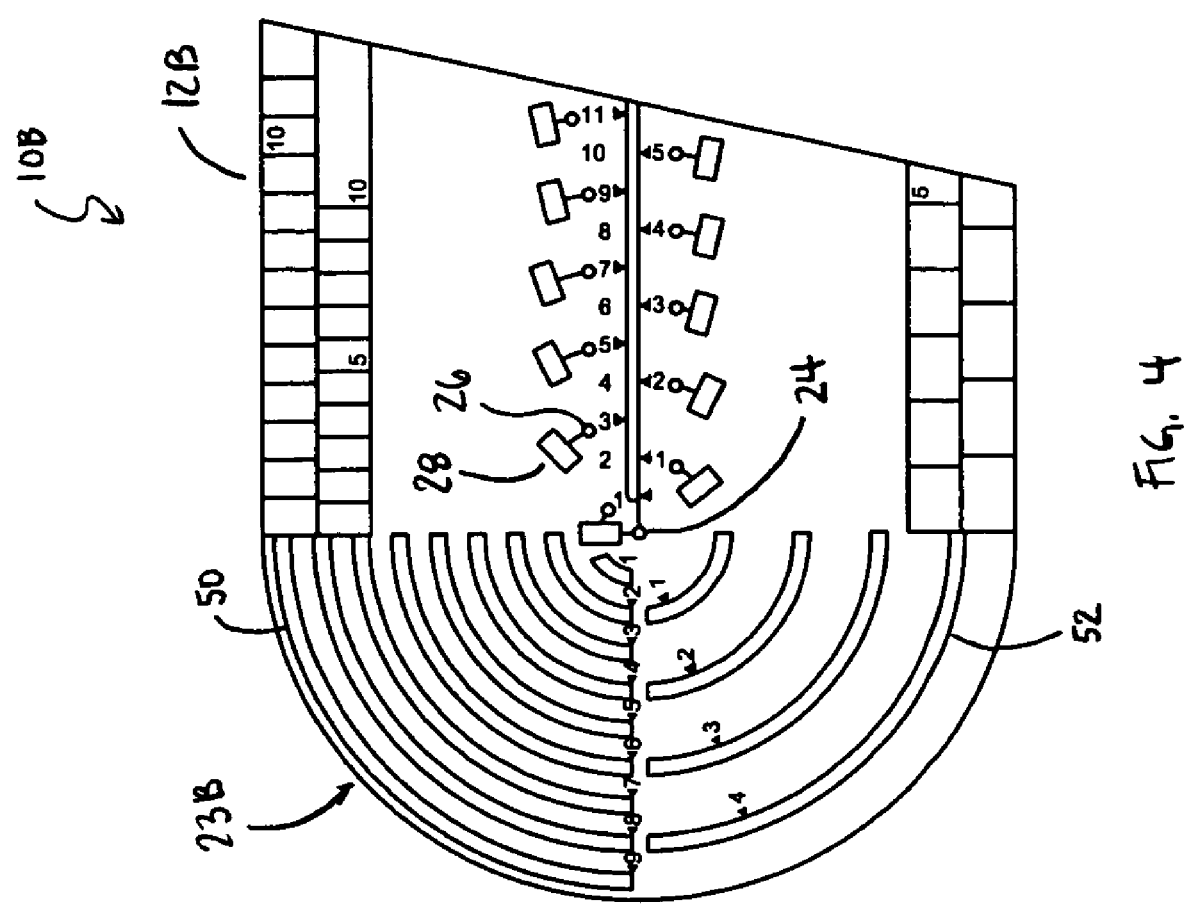
FIG. 4 is a top view of an aeronautical navigation plotting instrument according to another embodiment of the present invention.

FIG. 4 shows an aeronautical navigation plotting instrument 10B according to another embodiment of the invention. In this embodiment, the plotting instrument 10B is as described above and depicted in FIGS. 1-3, but the radial end 23B of the plotting instrument 10B of FIG. 4 includes a plurality of radial slots 50 extending through the frame 12B and incrementally positioned from the center hole 24 at an appropriate conversation scale, such as any of those discussed above. As such, arcs may be drawn by placing a writing instrument directly into a desired one of the radial slots 50 without the need to rotate the frame 10 about the center hole 24 as is required when drawing arcs by use of the first or second radial holes 26 or 28. In one embodiment, as shown in FIG. 4 includes a first plurality of radial slots 50 as described above and a second plurality of radial slots 52, similar to the first plurality of radial slots 50, but extending through the radial end 23B of the frame 12 at a different conversion scale from that of the first plurality of radial slots 50. In this embodiment, the first plurality of radial slots 50 are incrementally positioned from the center hole 24 according to the sectional chart scale, and the second plurality of radial slots 52 are incrementally positioned from the center hole 24 according to the terminal chart scale.

Although, in one embodiment, the first radial holes 26 are sized to receive the writing end of a pencil, such as a Pentel®0.5 mm mechanical pencil, and the second radial holes 28 are sized to receive the writing end of a highlighting writing instrument, such as a Marvy® Erasable Fluorescent pen, the center slot 22, the distance slots 32 and 36 and the radial slots 50 and 52 may each be sized to receive the writing end of a pencil, such as a Pentel®0.5 mm mechanical pencil, and/or the writing end of a highlighting writing instrument, such as a Marvy® Erasable Fluorescent pen.

The following is an exemplary transcript of a flight briefer describing a TFR to a pilot or crew member in charge of preparing flight plans:

"Pursuant to Title 14, section 91.141 of the Code of Federal Regulations, aircraft flight operations are prohibited within a 10 NMR (Nautical Mile Radius) of 334724N/1 175146W or the SLI VORTAC from 0308150255 (1955 local Aug. 14, 2003) until 0308140415 (2115 local Aug. 14, 2003) and 333913N/1175146W or the SLI114012.3 from 0308150415 (2115 local Aug. 14, 2003) until 0308151450 (0750 local Aug. 15, 2003) are prohibited except for . . . ."

This means that a TFR having a 10 NMR is in effect at a distance of 12.3 nautical miles and an angular orientation of 114 degrees from the SLI VORTAC. A method of using the aeronautical navigation plotting instrument 10 to manually plot the above described TFR involves the following steps:

1. Locate the originating VOR on an aeronautical chart. In this case the originating VOR is located on the Los Angeles Sectional aeronautical chart at a VORTAC designated the "SLI VORTAC," which is the VORTAC for the Los Alamitos Armed Air Forces Base;

2. Place the compass 14 of the plotting instrument 10 over the compass rose of the originating VOR, in this case the SLI VORTAC, and aligning the angular markings 20 of the compass with angular markings on the originating VOR compass rose;

3. Rotate the frame 12 of the plotting instrument 10 to a desired radial (angle) relative to the compass 14 of the plotting instrument 10 while holding the compass 14 in a fixed position over the originating VOR compass rose. In this case the frame is rotated 114 degrees from the SLI VORTAC;

4. Hold the frame 12 of the plotting instrument 10 at the above described orientation; insert a writing instrument, such as a 0.5 mm mechanical pencil, into the center slot 22; and draw a linear line radiating from the center 18 of the compass 14 of the plotting instrument 10 and extending outwardly therefrom to signify the radial from the originating VOR;

5. Draw a line that intersects the drawn radial line at a desired distance from the originating VOR by placing the zero point 41 of the graduated distance scale 30 adjacent to the originating VOR, measuring the desired distance from the graduated distance scale 30 (in this case 12.3 nautical miles) and placing an intersecting line over the radial line at the measured desired distance, this intersection represents the center point of the TFR (12.3 nautical miles from the SLI VORTAC at 114 degrees); and 6. Secure the center hole 24 of the radial end 23 of the plotting instrument 10 over the intersection mark with a writing instrument or a similar instrument; place a second writing instrument, such as a 0.5 mm mechanical pencil, into a desired radial hole 26 (in this case the radial hole 26 representing 10 nautical miles); and draw a circle representing the TFR by rotating the second writing instrument about the center hole 24.

The TFR boundary/airspace diameter is now graphically described on the aeronautical chart and flight planning may now occur with the knowledge of the TFR boundary/airspace. To further enhance the conspicuity of this boundary, a writing instrument capable of highlighting over this graphic can be utilized, such as a Marvy® Erasable Fluorescent pen. This may be accomplished by securing the center hole 24 over the intersection mark, (which becomes the center of the TFR) as described in step 6 above; inserting a highlighting writing instrument into a desired second radial hole 28 (in this case the second radial hole 28 representing nautical miles); and drawing a second circle over the first circle representing the TFR by rotating the highlighting writing instrument about the center hole 24. Note that the marking of the TFR by the highlighting instrument may be made in addition to the marking of the TFR as described in step 6 or in lieu of the marking of the TFR as described in step 6

To assist in the preservation of the aeronautical chart for future use, a highlighting writing instrument with an erasable fluorescent ink (such as a Marvy® Erasable Fluorescent pen) and/or a pencil may be used to draw the TFR. As such the TFR may be removed after a successful flight by applying an erasing end of the erasable highlighting writing instrument over the fluorescent ink, and/or applying an eraser to the pencil lines. This will normally return the aeronautical chart to an unblemished state and permit future TFRs and other flight paths/navigation plans to be plotted.

Figure 5:
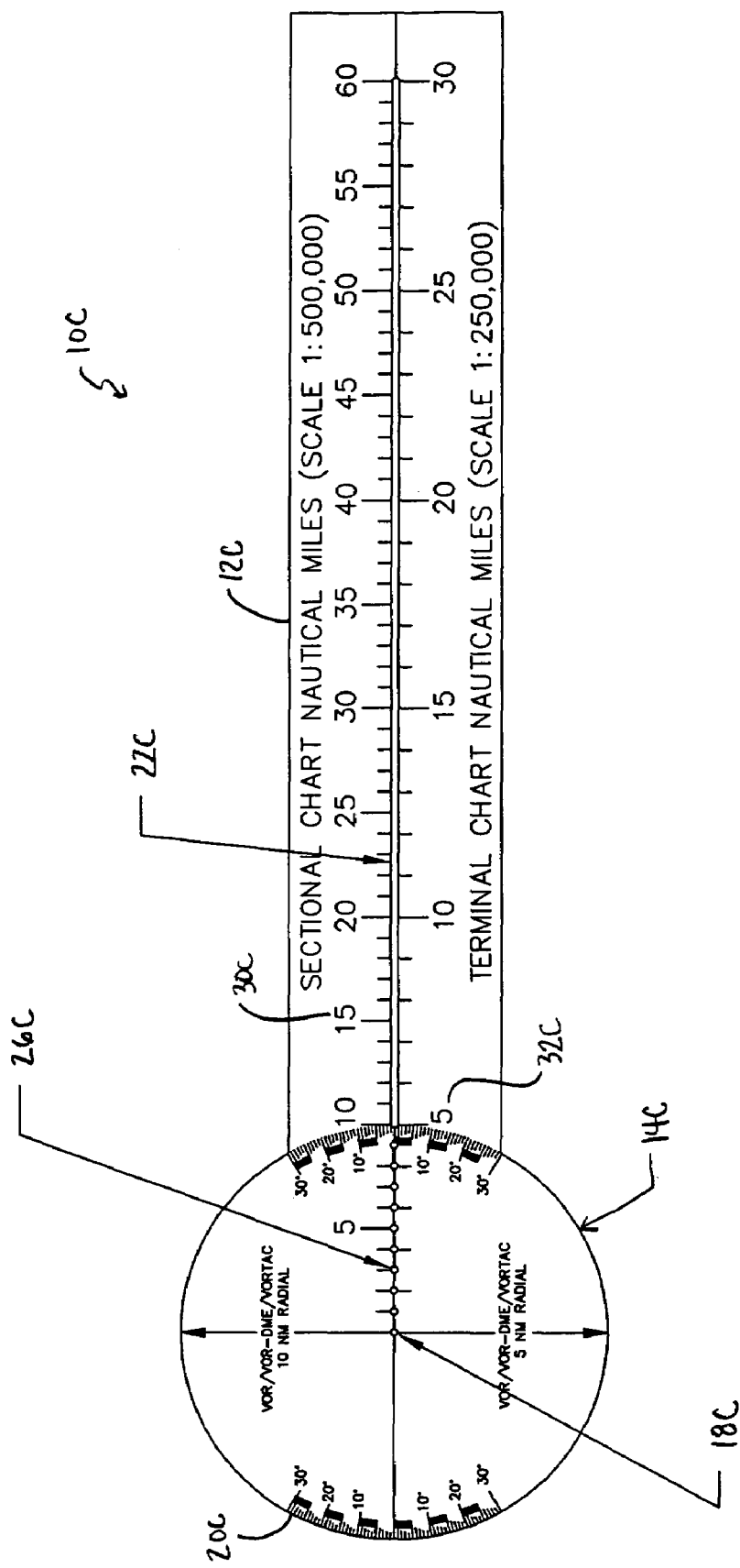
FIG. 5 is a top view of an aeronautical navigation plotting instrument according to another embodiment of the present invention.

FIG. 5 shows an aeronautical navigation plotting instrument 10C according to another embodiment of the invention. The plotting instrument 10C includes a plotting frame 12C connected to a compass rose 14C having a center 18C and a center slot 22C extending from a position adjacent to a peripheral edge of the compass 14C, similar to the compass rose 14, the compass center 18 and the center slot 22 described above with respect to FIGS. 1-3. The compass 14C includes angular markings 20C disposed on the periphery of the compass 14. The compass 14C is sized and shaped as described above with respect to the compass 14 of FIGS. 1-3.

In this embodiment, a first graduated distance scale 30C and a second graduated distance scale 34C are disposed adjacent to and on opposite sides of the center slot 22C. In this embodiment, the first graduated distance scale 30C includes nautical mile increments according to the sectional chart scale, and the second graduated distance scale 34C includes nautical mile increments according to the terminal chart scale.

This embodiment also includes radial holes 26C incrementally extending from the center 18C of the compass 14C. Although not shown, a second plurality of radial holes (similar to the second plurality of radial holes 28 of FIGS. 1-3) may be placed adjacent to the shown radial holes 26C. In addition, although not shown, the radial holes 26 and/or the second radial holes may extend past the compass 14C and into the area of the plotting instrument 10C containing the center slot 22. In this embodiment, the radial holes 26 includes nautical mile increments according to the sectional chart scale.

In this embodiment, the compass 14C is integrally formed with the plotting frame 12C. However, the compass 14C may be rotatably connected to the plotting frame 12C as described above with respect to FIGS. 1-3. The plotting instrument 10C is formed from a transparent non-metallic material, such as Lexan or Acrylic, or a metallic material, such as aluminum.

A method of using the aeronautical navigation plotting instrument 10C of FIG. 5 to manually plot a TFR involves the following steps:

1. Locate an originating VOR on an aeronautical chart;
2. Place the compass 14C of the plotting instrument 10C over the compass rose of the originating VOR, and align the angular markings 20C of the compass with angular markings on the originating VOR compass rose;
3. Rotate the frame 12 of the plotting instrument 10 to a desired radial (angle) relative to the compass rose of the VOR by referencing the annular markings 20C on the compass 14C of the plotting instrument 10C;
4. Hold the frame 12C of the plotting instrument 10C at the above described orientation; insert a writing instrument, such as a 0.5 mm mechanical pencil, into the center slot 22C; and draw a linear line radiating from the center 18C of the compass 14C of the plotting instrument 10C and extending outwardly therefrom to signify the radial from the originating VOR;
5. Draw a line that intersects the drawn radial line at a desired distance from the originating VOR by placing the zero point of the graduated distance scale 30C (in this case the center 18C of the compass 14C) over the center of the originating VOR, measuring the desired distance from the graduated distance scale 30C; and placing an intersecting line over the radial line at the measured desired distance, this intersection represents the center point of the TFR; and
6. Secure the center 18C of the compass 14C over the intersection mark with a writing instrument or a similar instrument; place a second writing instrument, such as a 0.5 mm mechanical pencil, into a desired radial hole 26C; and draw a circle representing the TFR by rotating the second writing instrument about the center hole 24.

Figure 6:
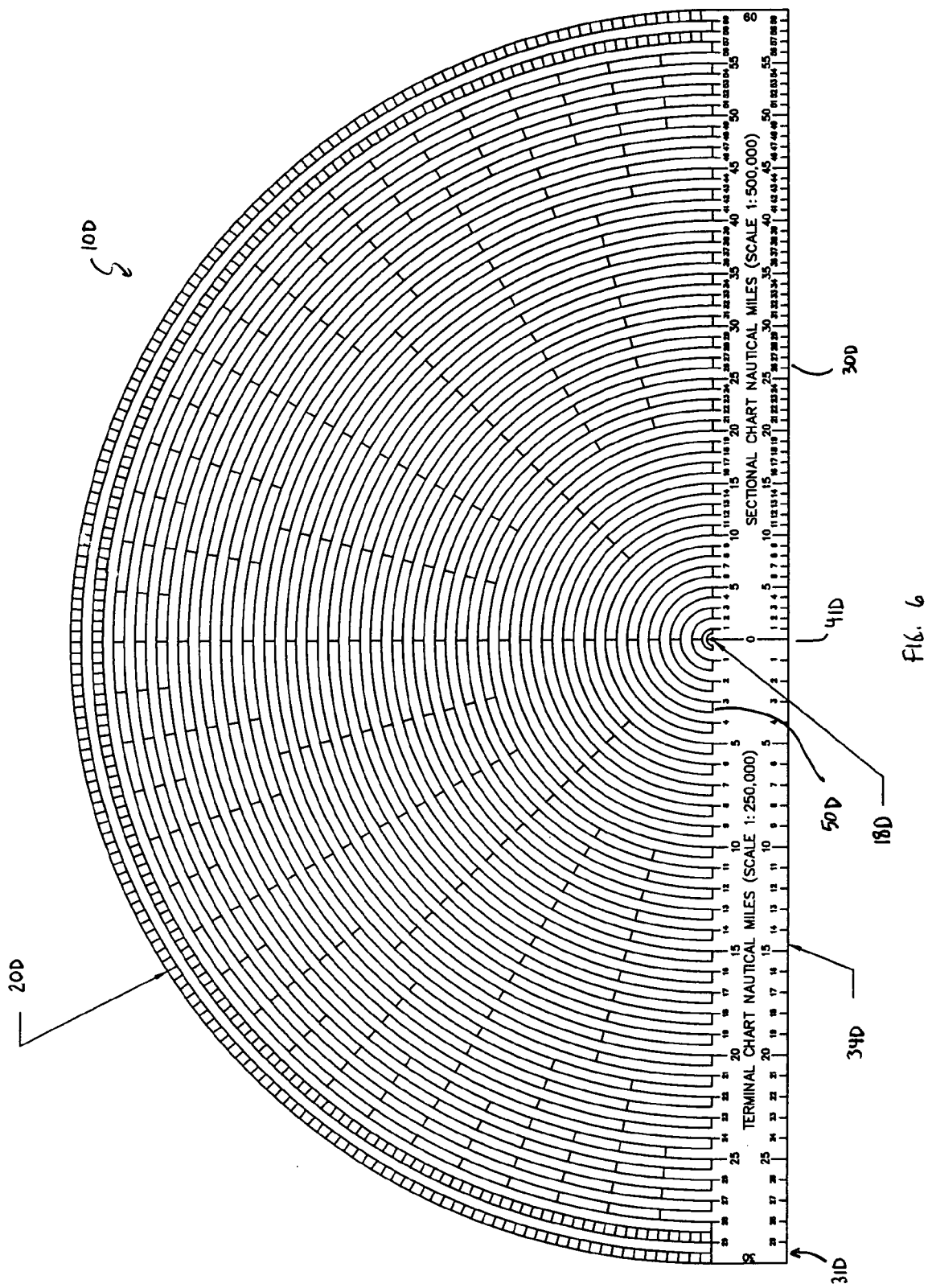
FIG. 6 is a top view of an aeronautical navigation plotting instrument according to yet another embodiment of the present invention.

FIG. 6 shows an aeronautical navigation plotting instrument 10D according to another embodiment of the invention. The plotting instrument 10D includes a center hole 18D and radial slots 50D extending therefrom. Adjacent to the radial slots 50D are angular markings 20D (in this case dashed lines) of various increments. Although numeric indicators are not shown they could be incorporated adjacent to each of the angular markings 20D shown on FIG. 6.

An edge 31D of the plotting instrument 10D includes first and second graduated distance scales 30D and 34D. In this embodiment a zero point 41D of each graduated distance scale 30D and 34D is disposed in the middle of the plotting instrument 10 aligned with the center hole 18D. On the right of the zero point 41D is the first graduated distance scale 30D including nautical mile increments according to the sectional chart scale; and on the left of the zero point 41D is the second graduated distance scale 34D including nautical mile increments according to the terminal chart scale. The plotting instrument 10D is formed from a transparent non-metallic material, such as Lexan or Acrylic, or a metallic material, such as aluminum A method of using the aeronautical navigation plotting instrument 10D of FIG. 6 to manually plot a TFR involves the following steps:

1. Locate an originating VOR on an aeronautical chart;
2. Place the center hole 18D of the plotting instrument 10D over the center of the originating VOR;
3. rotate the frame 12 of the plotting instrument 10 to a desired radial (angle) relative to the compass rose of the VOR by referencing the annular markings 20C on the compass 14C of the plotting instrument 10C;
4. Make a mark and the desired radial (angle) relative to the compass rose of the VOR by determining the desired radial (angle) by referencing the angular markings 20D and placing a mark next to the desired angular marking 20D;

5. Draw a linear line connecting the center of the VOR with the mark made in step for to signify the radial from the originating VOR;

6. Draw a line that intersects the drawn radial line at a desired distance from the originating VOR by placing the zero point 41D of the graduated distance scale 30D over the center of the originating VOR, measuring the desired distance from the graduated distance scale 30D; and placing an intersecting line over the radial line at the measured desired distance, this intersection represents the center point of the TFR; and 7. Secure the center hole 18D over the intersection mark with a writing instrument or a similar instrument; place a second writing instrument, such as a 0.5 mm mechanical pencil, into a desired radial slot 50D; and draw a circle representing the TFR by rotating the second writing instrument about the center hole 24.

The invention also contemplates a pre-packaged kit containing one or more writing instruments, such as a 0.5 mm Pentel® mechanical pencil, and one or more highlighting writing instruments, such as a Marvy® Erasable Fluorescent pen, in addition to an aeronautical navigation plotting instrument 10 according to one embodiment of the invention. The pre-packaged kit permits users to acquire a system that contains all of the basic tools and equipment necessary for completing the task of manually plotting a TFR onto an aeronautical chart.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

What is claimed is:

1. An aeronautical navigation plotting instrument comprising:
   a plotting frame;
   a compass rose attached to the plotting frame and comprising angular markings incrementally disposed thereon about a center of the compass for defining the angular orientation of the compass;
   a longitudinal slot aligned with the center of the compass rose and extending through the plotting frame to define an opening for receiving a writing instrument; and
   a plurality of first radial openings extending through the plotting frame to allow a writing instrument to extend therethrough, wherein each first radial opening is incrementally spaced from an originating opening in the plotting frame to form a plurality of incrementally spaced radial distances from the originating opening.

2. The plotting instrument of claim 1, wherein the originating opening is the center of the compass.

3. The plotting instrument of claim 2, further comprising a graduated distance scale adjacent to the longitudinal slot.

4. The plotting instrument of claim 1, further comprising a graduated distance scale adjacent to the longitudinal slot.

5. The plotting instrument of claim 1, wherein the compass is rotatably coupled to the plotting frame.

6. The plotting instrument of claim 1, further comprising a plurality of second radial openings extending through the plotting frame to allow a writing instrument to extend therethrough, wherein each second radial opening is adjacent to and at an equal radial distance from the originating opening as a corresponding one of the first radial openings.

7. The plotting instrument of claim 6, wherein each of the first radially openings are substantially circular in shape, and wherein each of the second radially openings are substantially rectangular in shape.

8. The plotting instrument of claim 6, wherein each of the first radially openings are shaped and sized to receive the writing end of a pencil writing instrument, and wherein each of the second radially openings are shaped and sized to receive the writing end of a highlighting writing instrument.

9. The plotting instrument of claim 1, further comprising a graduated distance scale adjacent to a first longitudinal edge of the plotting frame.

10. The plotting instrument of claim 9, further comprising a graduated distance slot extending along a lengthwise direction through the plotting frame to define an opening for receiving a writing instrument, wherein the graduated distance slot is directly adjacent to the graduated distance scale.

11. The plotting instrument of claim 10, wherein the graduated distance slot is parallel to the longitudinal slot.

12. The plotting instrument of claim 1, further comprising a plurality of radial slots extending through the plotting frame to allow a writing instrument to extend therethrough, wherein each radial slot is incrementally spaced from the originating opening to form a plurality of incrementally spaced radial distances from the originating opening.

13. The plotting instrument of claim 1, further comprising at least one parallel rule which is mounted to the plotting frame such that each at least one parallel rule is movable parallel to a longitudinal axis of the plotting frame.

14. An aeronautical navigation plotting instrument comprising:
    a plotting frame comprising a first end, a second end and first and second longitudinal edges extending therebetween;
    a compass rose attached to the first end of the plotting frame and comprising angular markings incrementally disposed thereon about a center opening of the compass for defining the angular orientation of the compass, wherein the center opening extends through the plotting frame to define an opening for receiving a writing instrument;
    a longitudinal slot aligned with the center of the compass rose and extending through the plotting frame to define an opening for receiving a writing instrument;
    an originating opening at the second end of the plotting frame, which is aligned with the longitudinal slot; and
    a plurality of first radial openings extending through the plotting frame to allow a writing instrument to extend therethrough, wherein each first radial opening is incrementally spaced from the originating opening to form a plurality of incrementally spaced radial distances from the originating opening.

15. The plotting instrument of claim 14, further comprising a plurality of second radial openings extending through the plotting frame to allow a writing instrument to extend therethrough, wherein each second radial opening is adjacent to and at an equal radial distance from the originating opening as a corresponding one of the first radial openings.

16. The plotting instrument of claim 15, wherein each of the first radially openings are substantially circular in shape, and wherein each of the second radially openings are substantially rectangular in shape.

17. The plotting instrument of claim 15, wherein each of the first radially openings are shaped and sized to receive the writing end of a pencil writing instrument, and wherein each of the second radially openings are shaped and sized to receive the writing end of a highlighting writing instrument.

18. The plotting instrument of claim 14, further comprising a graduated distance scale adjacent to the first longitudinal edge of the plotting frame.

19. The plotting instrument of claim 18, further comprising a graduated distance slot extending along a lengthwise direction through the plotting frame to define an opening for receiving a writing instrument, wherein the graduated distance slot is directly adjacent to the graduated distance scale.

20. The plotting instrument of claim 19, wherein the graduated distance slot is parallel to the longitudinal slot.

21. The plotting instrument of claim 14, further comprising a plurality of radial slots extending through the plotting frame to allow a writing instrument to extend therethrough, wherein each radial slot is incrementally spaced from the originating opening to form a plurality of incrementally spaced radial distances from the originating opening.

22. The plotting instrument of claim 14, further comprising at least one parallel rule which is mounted to the plotting frame such that each at least one parallel rule is movable parallel to a longitudinal axis of the plotting frame.

23. The plotting instrument of claim 14, wherein the compass is rotatably coupled to the plotting frame.

24. A prepackaged kit comprising:
an aeronautical navigation plotting instrument comprising:
a plotting frame,
a compass rose attached to the plotting frame and comprising angular markings incrementally disposed thereon about a center of the compass for defining the angular orientation of the compass,
a longitudinal slot aligned with the center of the compass rose and extending through the plotting frame to define an opening for receiving a writing instrument, and
a plurality of first radial openings extending through the plotting frame to allow a writing instrument to extend therethrough, wherein each first radial opening is incrementally spaced from an originating opening in the plotting frame to form a plurality of incrementally spaced radial distances from the originating opening;
at least one writing instrument; and
at least one highlighting writing instrument.

25. The kit of claim 24, wherein each at least one writing instrument is a mechanical pencil.

26. The kit of claim 24, wherein each at least one highlighting writing instrument is an erasable highlighting pen.

27. The kit of claim 24, wherein each at least one writing instrument is a mechanical pencil, and wherein each at least one highlighting writing instrument is an erasable highlighting pen.

28. A method of plotting a temporary flight restriction comprising:
providing an aeronautical navigation plotting instrument comprising:
a plotting frame,
a compass rose attached to the plotting frame and comprising angular markings incrementally disposed thereon about a center of the compass for defining the angular orientation of the compass,
a longitudinal slot aligned with the center of the compass rose and extending through the plotting frame to define an opening for receiving a writing instrument, and
a plurality of first radial openings extending through the plotting frame to allow a writing instrument to extend therethrough, wherein each first radial opening is incrementally spaced from an originating opening in the plotting frame to form a plurality of incrementally spaced radial distances from the originating opening;
placing the center of the compass of the plotting frame over a center of a VOR on an aeronautical chart;
orienting the longitudinal slot at a desired angular orientation with respect to the VOR by use of the angular markings of the compass;
drawing a linear line radiating from the center of the compass of the plotting frame and linearly extending therefrom to signify a radial from the VOR;
drawing an intersecting line on the radial at a desired distance from the center of the VOR forming a center of the temporary flight restriction by: placing a zero point of the graduated distance scale adjacent to the center of the VOR, measuring the desired distance from the center of the VOR by referencing the graduated distance scale, and drawing the intersecting line at the desired distance;
placing the originating opening of the plotting frame over the center of the temporary flight restriction;
placing a writing instrument within a desired one of the radial openings; and
rotating the writing instrument about the originating opening of the plotting frame to form the temporary flight restriction having a desired radius.

29. The method of claim 28, wherein the compass rose is rotatably attached to the plotting frame, such that said orienting of the longitudinal slot comprises rotating the plotting frame with respect to the compass rose until the longitudinal slot is disposed at a desired angular orientation with respect to the VOR determined by use of the angular markings of the compass.

30. The method of claim 28, wherein the graduated distance scale is disposed along a longitudinal edge of the plotting frame.

* * * * *